(12) United States Patent
Sun et al.

(10) Patent No.: US 10,773,809 B2
(45) Date of Patent: Sep. 15, 2020

(54) DEWATERING DEVICE FOR AN AIR CONDITIONING SYSTEM OF A PLANE

(71) Applicants: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

(72) Inventors: Xuede Sun, Shanghai (CN); Geping Li, Shanghai (CN); Xizhong Jian, Shanghai (CN); Xudong Yan, Shanghai (CN); Zhan Cheng, Shanghai (CN)

(73) Assignees: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

( * ) Notice: Subject to any disclaimer, the term of this patent is extended or adjusted under 35 U.S.C. 154(b) by 285 days.

(21) Appl. No.: 15/310,029

(22) PCT Filed: Sep. 22, 2015

(86) PCT No.: PCT/CN2015/090300
§ 371 (c)(1),
(2) Date: Nov. 9, 2016

(87) PCT Pub. No.: WO2016/045582
PCT Pub. Date: Mar. 31, 2016

(65) Prior Publication Data
US 2017/0267358 A1    Sep. 21, 2017

(30) Foreign Application Priority Data

Sep. 23, 2014  (CN) .......................... 2014 1 0490541

(51) Int. Cl.
*B64D 13/06* (2006.01)
*B01D 46/00* (2006.01)
(Continued)

(52) U.S. Cl.
CPC ......... *B64D 13/06* (2013.01); *B01D 46/0031* (2013.01); *B01D 46/10* (2013.01);
(Continued)

(58) Field of Classification Search
None
See application file for complete search history.

(56) References Cited

U.S. PATENT DOCUMENTS 2,485,522 A    10/1949  Andersen
2,835,340 A    5/1958   McGuff et al.
(Continued)

FOREIGN PATENT DOCUMENTS

CN    202092258 U    12/2011
CN    102369141 A    3/2012
(Continued)

OTHER PUBLICATIONS

Translation of WO 2014/027159, Espacenet, all pages (Year: 2018).*
(Continued)

*Primary Examiner* — Christopher P Jones
*Assistant Examiner* — Brit E. Anbacht
(74) *Attorney, Agent, or Firm* — Hamilton, Brook, Smith & Reynolds, P.C.

(57) ABSTRACT

The present invention provides a dewatering device for an air-conditioning system of a plane, comprising: one or more filter plates disposed within a mixing cavity of an air-
(Continued)

conditioning system of a plane, for filtering liquid-state water in mixed air in the mixing cavity, wherein the filter plates are configured to be inclinable relative to an axis of the mixing cavity, and an inclination angle thereof is adjustable so as to change a filtering amount of the mixed air.

5 Claims, 4 Drawing Sheets

(51) Int. Cl.
| | |
|---|---|
| B01D 46/10 | (2006.01) |
| B01D 46/46 | (2006.01) |
| B64D 13/02 | (2006.01) |
| G05D 22/02 | (2006.01) |
| F24F 3/14 | (2006.01) |
| B64D 13/00 | (2006.01) |
| F24F 13/04 | (2006.01) |

(52) U.S. Cl.
CPC ............ *B01D 46/46* (2013.01); *B64D 13/02* (2013.01); *G05D 22/02* (2013.01); *B01D 2277/20* (2013.01); *B01D 2279/50* (2013.01); *B64D 13/00* (2013.01); *B64D 2013/0648* (2013.01); *B64D 2013/0662* (2013.01); *B64D 2013/0688* (2013.01); *F24F 3/1423* (2013.01); *F24F 13/04* (2013.01); *Y02T 50/54* (2013.01); *Y02T 50/56* (2013.01); *Y10T 137/0329* (2015.04); *Y10T 137/87571* (2015.04)

(56) References Cited

U.S. PATENT DOCUMENTS

| | | | | |
|---|---|---|---|---|
| 3,811,252 | A * | 5/1974 | Evans | B01D 45/08 261/109 |
| 5,145,124 | A * | 9/1992 | Brunskill | B64D 13/06 244/118.5 |
| 6,214,076 | B1 * | 4/2001 | Beier | B01D 46/0005 55/484 |
| 8,721,406 | B2 * | 5/2014 | Kastell | B64D 13/00 244/53 B |
| 2007/0175622 | A1 | 8/2007 | Jee et al. | |
| 2008/0251592 | A1 * | 10/2008 | Baldauf | B64D 13/00 237/12.3 A |
| 2010/0243748 | A1 * | 9/2010 | Narikawa | F24F 3/1405 236/44 A |
| 2011/0180618 | A1 * | 7/2011 | Schumacher | B64D 13/00 236/44 A |
| 2012/0312520 | A1 * | 12/2012 | Hoke | B60H 1/00285 165/203 |
| 2014/0077396 | A1 * | 3/2014 | Nelson | B64D 13/06 261/5 |
| 2014/0329450 | A1 * | 11/2014 | Hoke | B60H 1/00742 454/75 |
| 2015/0033681 | A1 * | 2/2015 | Santini | B01D 46/0087 55/309 |
| 2015/0251743 | A1 * | 9/2015 | Reese | B63J 2/04 62/93 |
| 2015/0251766 | A1 * | 9/2015 | Atkey | B64D 13/08 244/13 |
| 2015/0323138 | A1 * | 11/2015 | Cunningham | F17D 5/00 137/12 |
| 2016/0016459 | A1 * | 1/2016 | Hamamoto | B60H 1/00921 62/160 |
| 2016/0107189 | A1 * | 4/2016 | Hashimoto | A61M 37/0015 236/1 C |
| 2016/0130005 | A1 * | 5/2016 | Robillard | B64C 1/10 244/118.5 |
| 2016/0195072 | A1 * | 7/2016 | MacAraeg | B64D 13/06 236/1 C |
| 2016/0231014 | A1 * | 8/2016 | Ro | G05B 15/02 |
| 2016/0288616 | A1 * | 10/2016 | Gutowski | B60H 1/2218 |
| 2018/0186469 | A1 * | 7/2018 | Gregory | B64D 45/00 |

FOREIGN PATENT DOCUMENTS

| | | |
|---|---|---|
| CN | 102778152 A | 7/2012 |
| CN | 202598782 U | 12/2012 |
| CN | 203196501 U | 9/2013 |
| CN | 104251547 A | 12/2014 |
| EP | 1 176 090 A1 | 1/2002 |
| JP | 62-225831 | 10/1987 |
| JP | 2006-162221 A | 6/2006 |
| JP | 2012163283 A | 8/2012 |
| KR | 20110139395 A | 12/2011 |
| WO | 2014/027159 A1 | 2/2014 |

OTHER PUBLICATIONS

International Search Report issued in International Application No. PCT/CN2015/090300, entitiled "Dewartering Device for Air Conditioning System in Aircraft," dated Dec. 21, 2015.

European Extended Search Report dated Nov. 27, 2017 for European Application No. 15844501.5, entitled "Dewatering Device for Air Conditioning System in Aircraft".

* cited by examiner

DEWATERING DEVICE FOR AN AIR CONDITIONING SYSTEM OF A PLANE

This application is the U.S. National Stage of International Application No. PCT/CN2015/090300, filed Sep. 22, 2015, which designates the U.S., published in Chinese, and claims priority under 35 U.S.C. §§ 119 or 365(c) to China Application No. 201410490541.7, filed Sep. 23, 2014. The entire teachings of the above applications are incorporated herein by reference.

FIELD OF THE INVENTION

The present invention relates to a dewatering device for an air conditioning system of a plane.

BACKGROUND OF THE INVENTION

A basic function of the air conditioning system of a plane is to adjust air from the ambience, which has been processed by an air-conditioning assembly, into desired air-conditioned air with appropriate temperature and humidity. This air-conditioned air is distributed inside a cabin through an air-conditioning pipeline.

Commercial aircrafts generally have a wide operation range and a special use environment. Its external environment changes greatly. Therefore, in some areas or hot working conditions of some areas, the humidity of ambient air will be very high. The external air with a relatively high humidity, after being subject to cooling processing by a refrigeration assembly of the air conditioning system of the airplane, the air temperature will drop while the relative humidity rises. When the relative humidity of the air reaches 100%, liquid water will exist in the air. Further, when the liquid water in the air-conditioned air reaches a certain concentration, it will enter into a cabin along the air-conditioning distribution pipeline, thereby forming "rain within cabin."

For example, In Sanya, Hainan where the temperature and humidity are usually very high, the moisture content of the air in July amounts to 19 k/kg dry air, which corresponds to a dew-point temperature of 23.5° C. That is, when an absolute humidity of the ambient air is constant and the temperature drops to 23.5° C., liquid water will be precipitated from the air. This is liquid water in the air.

On the other hand, when the humidity within the cabin is relatively high, the humidity of recycled air will also be high; while the relatively high temperature of the recycled air causes moisture in the recycled air to exist in a gas state before the moisture in the recycled air enters into a mixing cavity. After the recycled air enters into the mixing cavity, it is mixed with fresh air-conditioned air from the air conditioning assembly, and the temperature will drop rapidly. When the temperature is lower than the dew point temperature of the mixed air, moisture in the mixed air will be transformed into a liquid state from a gas state.

Further, when the air temperature is below 0° C., the liquid-state water in the air will form ice particles; as a result, ice-block will occur to a downstream condenser of refrigeration assembly of the air-conditioner system.

In order to effectively prevent occurrence of the ice-block phenomenon, current three-wheel-type refrigeration assembly cannot drop the air temperature too lowly at an outlet of the air-conditioning assembly. Although the three-wheel-type refrigeration assembly dewaters by high pressure such that the dewatering efficiency has been enhanced somewhat compared with earlier air conditioning assemblies, the three-wheel-type refrigeration assembly cannot remove completely the moisture in the air-conditioned air due to influence of ice-block on three-wheel-type refrigeration assembly. Therefore, under a working condition of a higher ambient air humidity (e.g., hot ground), liquid-state water or even ice will always exist in the air-conditioned air of the air-conditioning assembly. Currently, the dewatering efficiency of a newer model full-electricity air-conditioning assembly is also limited by air pressure conditions and the efficiency of the dewatering device such that it cannot effectively remove moisture in the air in the air-conditioning assembly.

Such liquid-state water or ice which fails to be removed timely will always enter into the cabin along an air-conditioning pipeline, and the crews and passengers will feel the water dropping phenomenon within the cabin, thereby reducing the comfort degree in the cabin.

FIG. 1 illustrates a schematic diagram of a dewatering mechanism of a three-wheeled air-conditioning system in the prior art. As illustrated in FIG. 1, a water separating device is additionally mounted between a condenser and a regenerator of the air-conditioning assembly. The water separating device increases a momentum of water drops in a mechanical way to remove free water drops in the air. However, due to limitation of air temperature, not all moisture in the air is precipitated into free water drops. Extra moisture in the air will further form free water drops after the air passes through a turbine, while this part of free water drops formed through the turbine will usually enters into the cabin along with the air, which dampens the comfort of crews and passengers in the cabin; meanwhile, it will also cause corrosion of a fuselage structure or increase a fault rate of electrical appliances within the cabin.

FIG. 2 illustrates a schematic diagram of a dewatering mechanism of a four-wheel type air conditioning system in the prior art. Similar to FIG. 1, in the four-wheel type air conditioning system in FIG. 2, a water separating device is also additionally mounted between the condenser and the regenerator of the air-conditioning assembly to remove free water drops in the air. However, although the dewatering efficiency of the four-wheel type air conditioning system is slightly higher than a three-wheel type air conditioning system, it cannot remove liquid-state water regenerated within the mixing cavity.

Therefore, the air-conditioning system above cannot effectively control liquid-state water content in the air entering into the cabin.

SUMMARY OF THE INVENTION

In view of the problems above, the present invention provides a solution of regulating water content in air-conditioned air entering into a cabin by performing further dewatering processing to the air-conditioned air at downstream of an air conditioning assembly before the air-conditioned air enters into the cabin, thereby enhancing comfort of the cabin.

Specifically, the present invention further removes liquid-state water in the air conditioned water by additionally mounting a dewatering device (e.g., a filter plate) within a mixing cavity.

According to one aspect of the present invention, there is provided a dewatering device for an air-conditioning system of a plane, comprising: one or more filter plates disposed within a mixing cavity of an air-conditioning system of a plane, for filtering liquid-state water in mixed air in the mixing cavity, wherein the filter plates are configured to be inclinable relative to an axis of the mixing cavity, and an inclination angle thereof is adjustable so as to change a filtering amount of the filter plate with respect to the mixed air.

In one implementation, the dewatering device further comprises: one or more humidity sensors configured to sense content of liquid-state water in the air-conditioned air or mixed air, and a controller configured to receive the content of liquid-state water sensed by the humidity sensors, and compare the content with a predetermined threshold to generate a filter plate regulation signal, the filter plate regulation signal being for regulating the inclination angle of the filter plate.

In one implementation, the dewatering device further comprises: one or more filter plate regulation drivers each being coupled to a corresponding filter plate, for regulating an inclined angle of the filter plate according to a filter plate regulation signal from the controller.

In one implementation, one or more humidity sensors are located downstream of the water separating device of the air-conditioning assembly, at an outlet of an air-conditioned air from the air-conditioning assembly, and/or at an inlet and an outlet of the mixed cavity.

In one implementation, the dewatering device further comprises: a drainage pipe located at a bottom of the mixed cavity, for discharging the liquid-state water filtered by the filter plate out of the mixed cavity.

In one implementation, the dewatering device further comprises: a pressure sensor located at an outlet of the mixed cavity, for sensing air pressure at the outlet of the mixed cavity, wherein the controller receives an air pressure value sensed by the pressure sensor, and when determining decrease of the air pressure value, generating a fan control signal to enhance rotation speed of a recycling fan.

The solution of the present invention compensates inefficiency of the dewatering device in an air-conditioning assembly in the air-conditioning system of the plane, enhances the dewatering efficiency, and meanwhile enhances a temperature evenness of the air conditioning air, effectively prevents liquid-state water from entering into the cabin, and enhances the comfort degree of the crew and passengers.

Further, by regulating the rotation speed of the recycling fan, the efficiency of mixing the recycled air and fresh air is enhanced, the evenness of the air supply temperature of the air-conditioner is improved, and the comfort degree of the crew and passengers is enhanced.

BRIEF DESCRIPTION OF THE ACCOMPANYING DRAWINGS

The present invention will be understood better after reading the depiction of the preferred embodiments of the present invention with reference to the accompanying drawings, other objectives, details, features, and advantages of the present invention will become more apparent. In the accompanying drawings.

DETAILED DESCRIPTION OF THE PREFERRED EMBODIMENTS

Figure 1:
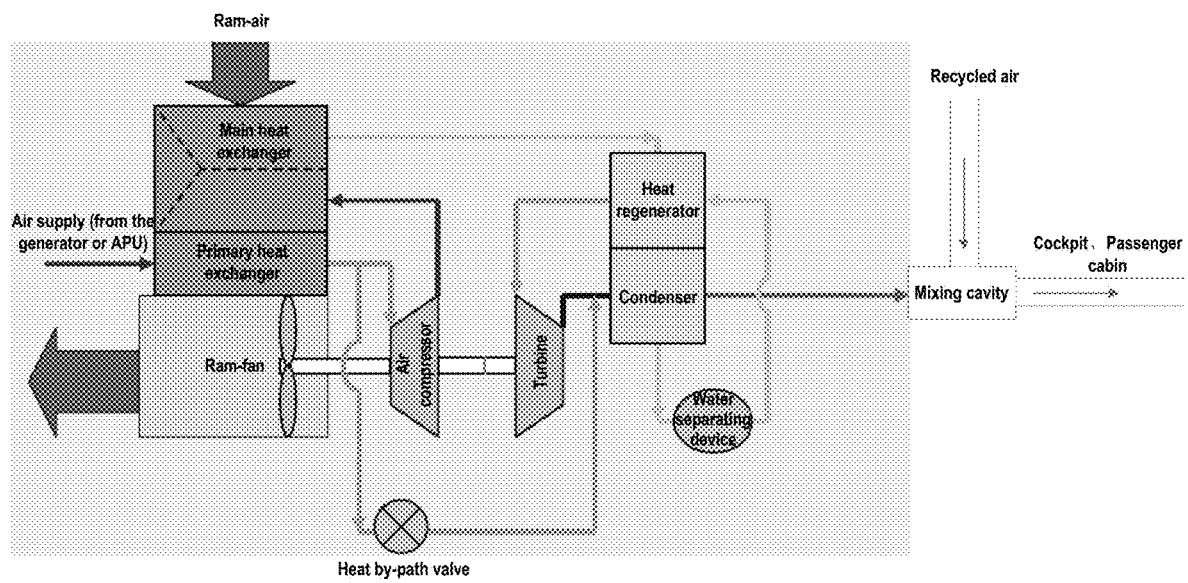
FIG. 1 illustrates a schematic diagram of a dewatering mechanism of a three-wheel-type air conditioning system in the prior art.

Hereinafter, the preferred embodiments of the present invention will be described in more detail with reference to the accompanying drawings. Although the preferred embodiments of the present are illustrated in the drawings, it should be understood that the present invention may be implemented in various forms, but should not be limited to the embodiments here. On the contrary, providing of these embodiments is to make the present invention more thorough and complete so as to convey the scope of the present invention completely to those skilled in the art.

Figure 2:
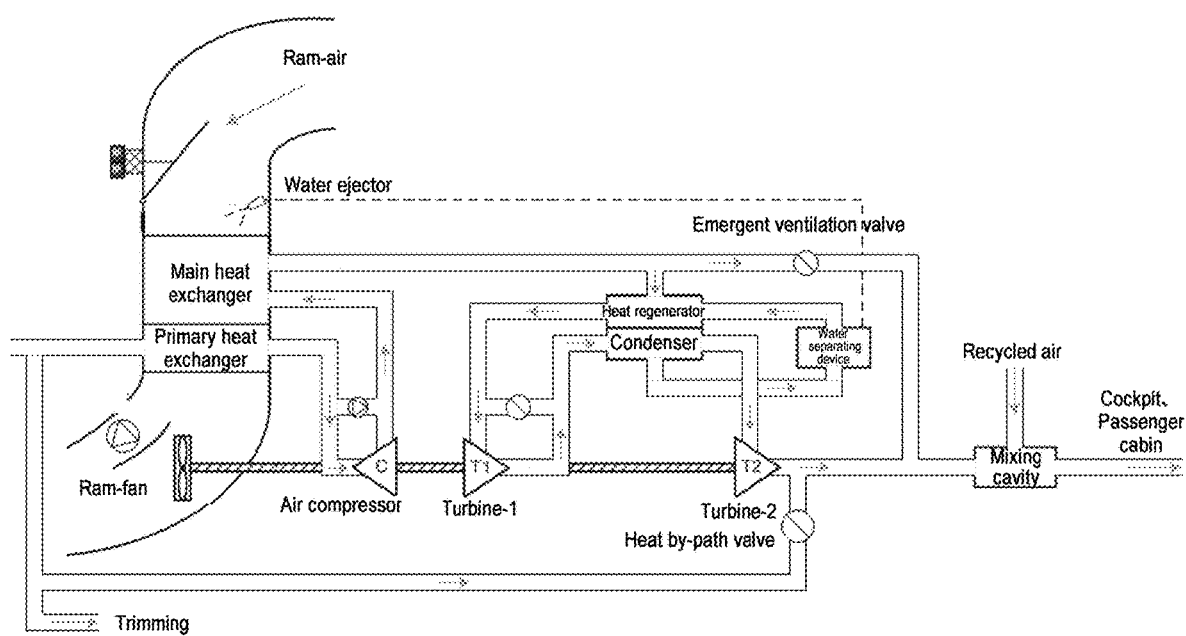
FIG. 2 illustrates a schematic diagram of a dewatering mechanism of a four-wheel-type air conditioning system in the prior art.
Figure 3:
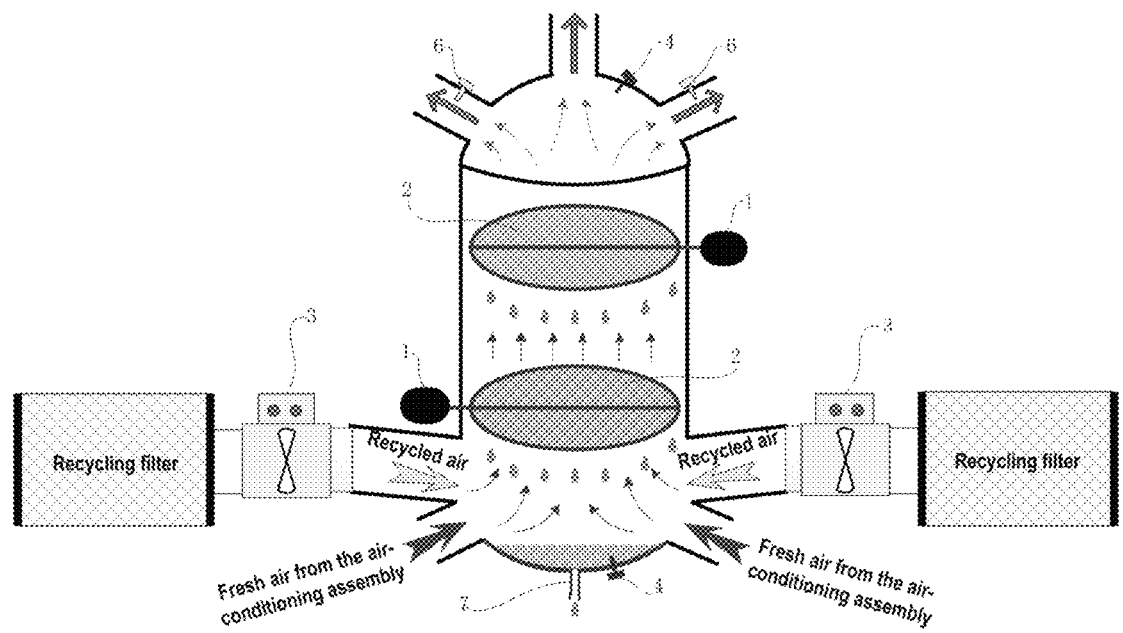
FIG. 3 illustrates a schematic diagram of a dewatering device for an air conditioning system of a plane according to one embodiment of the present invention.
Figure 4:
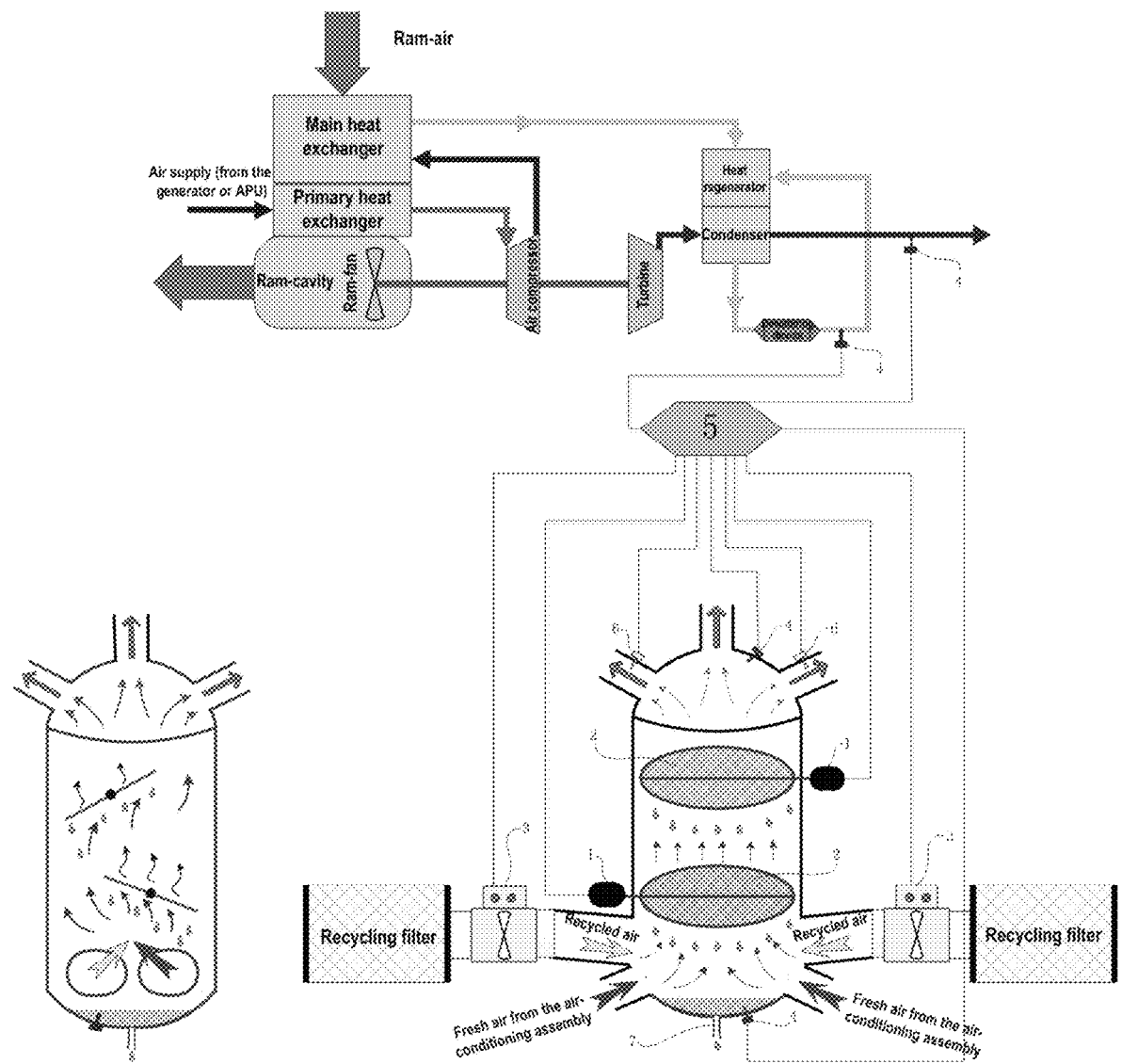
FIG. 4 illustrates a schematic diagram of an operating principle of an air-conditioning system of a plane according to the embodiments of the present invention.

FIG. 3 illustrates a schematic diagram of a dewatering device 10 for an air-conditioning system of a plane according to one embodiment of the present invention. FIG. 4 illustrates a schematic diagram of an operating principle of the dewatering device 10 according to the embodiments of the present invention. The dewatering device 10, for example, may be implemented in a mixed cavity (as illustrated in FIGS. 1 and 2) of the air conditioning system of the plane, and the mixing cavity is for mixing air-conditioned air from the air-conditioning assembly and the recycling air from the recycling assembly and feeding the mixed air into the cabin.

As illustrated in FIG. 3, the dewatering device 10 comprises one or more filter plates 2 located in the mixing cavity, and a passageway for the mixed air to enter into the cabin, for filtering the liquid-state water in the mixed air through the mixing cavity. The filter plate 2 may be configured to incline relative to an axis of the mixing cavity, and its inclination angle may be regulated to change a filter amount of the filter plate with respect to the mixed air.

In the depiction herein, the inclination angle of the filter plate 2 refers to an included angle between the filter plate 2 and an axis of the mixing cavity. However, those skilled in the art may understand that the definition of the inclination angle is not limited thereto, and it may have other definitions. For example, the inclination angle may be defined as an included angle between the filter plate 2 and a base plate of the mixing cavity. In this case, the part regarding regulation of the inclined angle needs to be executed reversely in the description below.

The filter plate 2 may be implemented using any currently known or future designed physical or chemical manners capable of filtering the liquid-state water in the air and meanwhile guaranteeing air flow rate. Preferably, the filter plate 2 performs dewatering in a physical manner so as to avoid inconvenience caused by changing the filter plate.

The dewatering device 10 further comprises one or more humidity sensors 4 configured to sense content of liquid-state water in air-conditioned air or mixed air, and transmit the sensed content of the liquid-state water to the controller 5.

For example, the humidity sensor 4 may be disposed downstream of a water separating device of an air-conditioning assembly, at an outlet of air conditioning air from the air-conditioned assembly, and/or at an inlet and an outlet of the mixing cavity, for sensing content of liquid-state water in air at corresponding positions. However, the present invention is not limited thereto. Those skilled in the art may understand that the humidity sensor 4 may be located at any position in the air conditioning system of a plane which can sense content of liquid-state water in the air-conditioned air and/or recycled air (or mixed air).

In one implementation, the humidity sensor 4 may also be implemented at a base plate of the mixing cavity. At this point, a water volume detector may be used to implement the humidity sensor 4, for detecting water volume filtered by the filter plate 2 and aggregated at the base plate of the mixing cavity. The water volume detected in this manner can also indirectly indicate content of the liquid-state water in the air.

The controller 5 is configured to receive content of the liquid-state water sensed by the humidity sensor 4 and compare the content with a predetermined threshold, to generate a filter plate regulation signal, for regulating an inclined angle of the filter plate.

Here, the predetermined threshold refers to an acceptable upper limit value of air humidity within a cabin under a condition of guaranteeing comfort of the cabin. When content of the liquid-state water sensed by the humidity sensor 4 is greater than the predetermined threshold, it indicates a need of further dewatering to the mixed air entering into the cabin so as to guarantee comfort of the cabin. In this case, the controller 5 generates a corresponding filter plate regulation signal so as to indicate enlargement of the inclination angle of the filter plate 2.

In another case, when the content of liquid-state water sensed by the humidity sensor 4 is relatively lower (e.g., when the plane is a cruising state), the controller 5 generates a corresponding filter plate regulation signal to indicate narrowing the inclination angle of the filter plate 2.

The dewatering device 10 further comprises one or more filter plate regulation driver 1 each being coupled to a corresponding filter plate 2, for regulating an inclination angle of the filter plate 2 according to the filter plate signal from the controller 5. Change of the inclination angle of the filter plate 2 will change the magnitude of the filter amount of the mixed air, thereby changing a filter degree of the liquid-state water in the mixed air.

The liquid-state water filtered off by the filter plate 2 is aggregated at a bottom of the mixing cavity. The dewatering device 10 may also comprise a drainage pipe 7 located at the bottom of the mixing cavity, for discharging the liquid-state water filtered off by the filter plate 2, thereby achieving an objective of discharging water. The discharged liquid-state water may be discharged out of the cabin through a drainage system of the airplane.

In one implementation, when the inclination angle of the filter 2 is relatively large (e.g., the filter plate regulation driver 1 enlarges the inclination angle of the filter plate 2 since the content of the liquid-state water sensed by the temperature sensor 4 is greater than the predetermined threshold), the filter amount of the mixed air in the mixing cavity increases, such that the air flow resistance increases. In this case, the pressure at the outlet of the mixing cavity drops, and the wind supply pressure and wind supply speed at downstream will be affected.

To this end, the dewatering device 10 may further comprise a pressure sensor 6 located at the outlet of the mixing cavity, for sensing the air pressure at the outlet of the mixing cavity, and transmitting the sensed air pressure to the controller 5.

When the controller 5 determines that the air pressure value received from the pressure sensor 6 decreases, a corresponding fan control signal is generated for enhancing a rotation speed of the recycling fan 3. Here, the recycling fan 3 is a part of the recycling assembly of the plane, for supplying air through the recycling filter into the mixing cavity, so as to be re-distributed with the air-conditioned air from the air conditioning assembly through the mixing cavity into the cabin.

On the other hand, when the content of the liquid-state water sensed by the humidity sensor 4 is relatively low (e.g., when the plane is in a cruising state), the controller 5 may generate a corresponding regulation signal to narrow the inclination angle of the filter plate 2 to a smaller angle so as to reduce the filter amount of the filter plate with respect to the mixed air, and meanwhile decreases the rotational speed of the recycling fan 3 to a level satisfying the outlet pressure of the mixing cavity.

Using the dewatering device according to the present invention, by driving the filter plate regulation driver to change, in real time, the inclination angle of the filter plate according to the content of the liquid-state water in the mixed air, the liquid-state water and ice in the air-conditioned air can be effectively removed, and meanwhile, the mixing effect of the recycling air and the fresh air can also be improved.

Further, in the present invention, the rotational speed of the recycling fan can be regulated in real time to compensate for pressure drop at the outlet of the mixing cavity caused by enlargement of the inclination angle of the filter plate, thereby enhancing temperature evenness of the wind supplied by the air-conditioner, which further enhances comfort of embarkation.

A person of normal skill in the art should also understand that various exemplary logic blocks, modules, circuits and algorithm steps depicted in conjunction with the embodiments of the present application may be implemented as electronic hardware, computer software, or a combination thereof. In order to clearly express such interchangeability between hardware and software, various exemplary components, blocks, modules, circuits, and steps above are all described in generality about their functions. As to such functions are implemented into hardware or software, it dependents on a specific application and the design constraint conditions applied on the whole system. Those skilled in the art may implement the described functions for each specific application in a flexible manner. However, such implementation decision should not be construed as departing from the protection scope of the present invention.

The depiction above is for enabling any person of normal skill in the art to implement or use the present invention. For persons of normal skill in the art, various modifications of the present disclosure are obvious, and a general principle defined herein may be applied to other transformations without departing from the spirit and protection scope of the present invention. Therefore, the present invention is not limited to the instances and design as depicted in the present disclosure but consistent with the broadest scope of the principle and novelty characteristics of the present disclosure.

The invention claimed is:

1. A dewatering device for an air-conditioning system of a plane, comprising:
   one or more filter plates disposed within a mixing cavity downstream of an air-conditioning assembly of a plane, for filtering liquid-state water in mixed air in the mixing cavity, wherein the filter plates are configured to be inclinable relative to an axis of the mixing cavity, and an inclination angle thereof is adjustable so as to change a filtering amount of the mixed air, wherein the mixing cavity is adapted to mix fresh air-conditioned air from the air-conditioning assembly and recycling air from a recycling assembly, and to feed the mixed air into the cabin;

one or more humidity sensors configured to sense content of liquid-state water in the air-conditioned air or mixed air, and a controller configured to receive the content of liquid-state water sensed by the humidity sensors, and to compare the content with a predetermined threshold to generate a filter plate regulation signal, the filter plate regulation signal being for regulating the inclination angle of the filter plate, so that the dewatering device is able to adjust the humidity in the mixing cavity and the aircraft cabin to enhance the comfort degree.

2. The dewatering device according to claim 1, further comprising:

one or more filter plate regulation drivers, each being coupled to a corresponding filter plate, for regulating the inclination angle of the filter plate according to the filter plate regulation signal from the controller.

3. The dewatering device according to claim 1, wherein one or more humidity sensors are located downstream of a water separating device of the air-conditioning assembly, at an outlet of an air-conditioned air from the air-conditioning assembly, and/or at an inlet and an outlet of the mixing cavity.

4. The dewatering device according to claim 1, further comprising:

a drainage pipe located at a bottom of the mixing cavity, for discharging the liquid-state water filtered by the filter plate out of the mixing cavity.

5. The dewatering device according to claim 1, further comprising:

a pressure sensor located at an outlet of the mixing cavity, for sensing air pressure at the outlet of the mixing cavity, wherein the controller receives an air pressure value sensed by the pressure sensor, and when determining decrease of the air pressure value, generating a fan control signal to regulate rotation speed of a recycling fan.

* * * * *